United States Patent
Müller

(10) Patent No.: US 7,175,579 B2
(45) Date of Patent: Feb. 13, 2007

(54) MACHINE TOOL WITH GRIPPER AND/OR TOOL MAGAZINE SYSTEM

(75) Inventor: Hans-Dieter Müller, Dirlewang (DE)

(73) Assignee: Grob-Werke Dr. h.c. mult. Dipl.-Ing. Burkhart Grob e.K., Mindelheim (DE)

(*) Notice: Subject to any disclaimer, the term of this patent is extended or adjusted under 35 U.S.C. 154(b) by 0 days.

(21) Appl. No.: 10/920,242

(22) Filed: Aug. 18, 2004

(65) Prior Publication Data

US 2005/0020420 A1 Jan. 27, 2005

Related U.S. Application Data

(62) Division of application No. 09/918,457, filed on Aug. 1, 2001, now Pat. No. 6,783,484.

(30) Foreign Application Priority Data

Aug. 8, 2000 (DE) .................. 100 39 525

(51) Int. Cl.
*B23Q 3/157* (2006.01)

(52) U.S. Cl. .............. 483/58; 483/901; 483/902; 414/730; 414/911; 414/226.01; 414/223.02; 294/113

(58) Field of Classification Search ............... 483/58, 483/49, 59, 902, 28, 42–43, 47, 901; 211/1.51–1.57; 414/730, 23, 910, 911, 226.01, 223.01–223.02; 83/563; 294/113, 86.4; 409/233
See application file for complete search history.

(56) References Cited

U.S. PATENT DOCUMENTS

| | | | |
|---|---|---|---|
| 3,811,179 A * | 5/1974 | Anderson .................. 483/46 |
| 3,953,039 A * | 4/1976 | Hauge et al. .............. 483/34 |
| 3,989,260 A * | 11/1976 | Zonkov et al. ............ 279/4.01 |
| 4,041,601 A * | 8/1977 | Schimanski ............... 483/45 |
| 4,238,034 A | 12/1980 | Sipek et al. |
| 4,335,498 A * | 6/1982 | Hague et al. ............. 483/49 |
| 4,587,716 A * | 5/1986 | Bytow ....................... 483/14 |
| 4,604,787 A * | 8/1986 | Silvers, Jr. ................. 483/55 |
| 4,827,599 A | 5/1989 | Winkler et al. |
| 5,107,581 A * | 4/1992 | Reuter et al. ............. 483/61 |
| 5,188,579 A * | 2/1993 | Ruschle et al. ........... 483/902 |
| 5,328,224 A * | 7/1994 | Jacobsen et al. .......... 294/104 |
| 5,372,568 A | 12/1994 | Matsuoka |

(Continued)

FOREIGN PATENT DOCUMENTS

DE   3440604 A1   5/1986

(Continued)

OTHER PUBLICATIONS

Patent Abstracts of Japan, vol. 1997, No. 2, Feb. 28, 1997 & JP08257862A (Okuma Mach Works Ltd), Oct. 8, 1996.

(Continued)

*Primary Examiner*—Erica Cadugan
(74) *Attorney, Agent, or Firm*—Jacobson Holman PLLC

(57) ABSTRACT

A tool magazine system and a gripper for a machining spindle. The gripper is fed to the tool laterally with respect to the rotational or longitudinal axes of the tool, particularly substantially at right angles to the axis, and should grasp the tool.

9 Claims, 5 Drawing Sheets

U.S. PATENT DOCUMENTS 5,383,832 A         1/1995  Blazek et al.
5,586,387 A  *  12/1996  Nakatani et al. .............. 29/703
5,672,145 A  *   9/1997  Pollington et al. ............ 483/59
5,674,170 A  *  10/1997  Girardin ...................... 483/59
5,690,137 A  *  11/1997  Yamada ...................... 409/233

FOREIGN PATENT DOCUMENTS

EP          0355271  A2      2/1990
EP          0585471  A1      3/1994
EP          0623419  A2     11/1994
JP          4-294952 A   *  10/1992

OTHER PUBLICATIONS

Patent Abstracts of Japan, vol. 2000, No. 8, Oct. 6, 2000 & JP2000141155A (Toshiba Mach Co Ltd), May 23, 2000.
Patent Abstracts of Japan, vol. 2000, No. 15, Apr. 6, 2001 & JP2000343367A (Mori Machinery Corp), Dec. 12, 2000.

* cited by examiner

MACHINE TOOL WITH GRIPPER AND/OR TOOL MAGAZINE SYSTEM

This is a Divisional of application Ser. No. 09/918,457, filed Aug. 1, 2001, now U.S. Pat. No. 6,783,484.

BACKGROUND OR THE INVENTION

The invention relates to a tool magazine system for a machining spindle, comprising a gripper which picks up tools from a tool magazine, guides them to a machining spindle, for example of a machining centre or machine tool, and passes them to said spindle.

Tool magazine systems of this type are well known. In machine tools such as machining centres, cutting machines or lathes, particularly for the metal-processing industry, their function is to make a wide variety of tools available in rapid sequence according to the predetermined machining steps of the tool spindle. The tools in question are generally cutting tools such as drills or milling cutters. But it is perfectly possible to provide a machining head instead of a machining spindle, the head possibly having a tool spindle.

The known solution has the disadvantage that the arrangement of the tool magazine, in which several hundred very different tools are stored, takes up a very large space. Known systems pick up the tools from above, which necessitates a flat arrangement of the tools adjacent one another. At the same time the manipulator which handles the gripper needs a corresponding amount of space, resulting in very large installations.

The object of the present invention is therefore to provide an improved tool magazine system of the type described above, so as to enable a larger number of tools to be accommodated in the tool magazine system, while maintaining the same area requirement.

BRIEF SUMMARY OF THE INVENTION

The present invention provides a tool magazine system for a machining spindle, comprising a gripper which picks up tools from a tool magazine, guides them to a machining spindle and passes them to a spindle wherein said gripper is fed to said tool laterally with respect to the axis of rotation, or longitudinal axis, of said tool, particularly substantially at right angles to that axis, and should grasp said tool.

This construction according to the invention allows tools to be superimposed along the longitudinal axis, vertically in the case of a rack, yet allows said tools to be grasped and transported securely. As it is in principle possible to store a plurality of tools above each other there is no problem in having said tool magazine in the form of a rack, and hence the area requirement can be considerably reduced.

The invention is in no way restricted to having said tools superimposed along the longitudinal axis, e.g. vertically. Similarly it may also be applied to existing tool magazines where said tools are e.g. juxtaposed flat or offset in a stepped arrangement. Said tool magazine system according to the invention can also accommodate tools stored in a lying position, i.e. tools with their longitudinal axis substantially horizontal.

In the tool magazine system according to the invention, the gripper approaches the tool laterally with respect to the longitudinal/rotational axis of said tool. In the state of the art, movement substantially along the longitudinal or rotational axis was envisaged (usually vertically from above), as the gripper means grasped said tool or tool shank in an axial direction. To permit these various complex movements of the gripper, said gripper is arranged on a manipulator and mounted for multi-axial movement. There may for example be a five or six-axis system with three translatory axes and two, three or even more rotational axes being provided for the gripper.

In a preferred embodiment of the tool magazine system according to the invention, a drip trough for collecting dispersed cooling liquid is provided below the tool magazine, and said drip trough is connected to the cooling liquid circuit. When the operation is started, the tool is sprayed with cooling liquid, firstly to lower its temperature and secondly to float away the detached chips. Said cooling liquid is in a circuit and, when the floated-off particles have been cleaned or filtered off, the liquid is fed by a pumping system to the tool or workpiece and sprayed onto the tool or workpiece at high pressure. When the particular step in the operation is terminated the dripping wet tool is removed from the work spindle or machining head by the gripper and transported back into the magazine. The cooling liquid clinging to it is also dispersed into the tool magazine. While the tool is out of action the liquid drips off it and is caught in the drip trough proposed according to the invention, which returns the collected liquid to the cooling liquid circuit.

To prevent all the other tools below the dripping one from being fouled with the cooling liquid mixed with abraded chips and the like, a drip sheet is provided in the storage means for the tools, so that the tool below it is protected from the liquid as by a rain canopy.

The invention further provides a gripper for taking hold of, conveying and/or passing on a tool, particularly for conveying a tool from a tool magazine to a work spindle, the tool in particular having a shank, wherein a groove, recess or shoulder with which a first member of the gripper interacts is provided in the surface of the shank or tool, and a second member of the gripper interacts with a different region of the shank or tool.

As with the form of the tool magazine system according to the invention, an improved gripper is similarly proposed, allowing the tool to be grasped substantially at right angles or laterally with respect to its preferred axis. Two different, competitive systems are substantially known for grasping tools. One is a so-called flap system, where two elements are moved axially or at an acute angle to that axis and the flaps are constructed so that they engage in the shoulders and shanks or, respectively, in slots or grooves in the tool and are held therein. Another principle operates like tongs, that is to say, the tool is picked up in an axial direction. In the state of the art solution however special undercut portions, shoulders and the like on the tool or tool shank are regularly used to hold the tool. It is often also desirable for the tool to be passed from one gripper to another, e.g. for a first gripper to take it out of the magazine and a second gripper to be responsible for inserting the tool in the work head/spindle. The known principles do not apply here, as they are generally only unilateral, i.e. they only allow the tool to be grasped at one side by the gripper.

The form of gripper now proposed according to the invention therefore also allows another gripper system, namely one approaching the tool laterally or at right angles according to the movement of the gripper. For this purpose it is proposed that the second member of the gripper should lie against the surface of the shank or the outside diameter of the tool. The second member is shaped so that it need not be held on shoulders, axial slots and the like, as was necessary in the prior art. Instead the second member is positioned on the surface of the shank or the outside diameter of the tool so that the tool is guided radially of the gripper and fixed. The axial guidance is provided by the first member, which interacts with a corresponding lug, a projection or a recess, groove or the like in the tool.

It has been indicated that a shank is provided on the tool, its external profile or outside diameter being considerably larger than the diameter of the tool. The invention is not however restricted to such a structure. It may be used in the same way in a tool without a shank, in which case the tool surface takes over the corresponding functions of the shank surface. The same applies to tools of the type where said shank is set back from the effective parts of the tool.

Use of the shank does however have a function, particularly in automatic machining of workpieces: it defines in terms of contact surfaces the exact position of the tool in a longitudinal direction and also relative to the diameter for correspondingly accurate machining. A plane face is provided on the shank for this purpose, particularly at right angles to the longitudinal axis; it is described as the functional surface and is machined extremely accurately. Known grasping principles have particularly included the functional surface for holding the tool. Such a principle is disadvantageous, firstly because the functional surface may be damaged as a result of the holding forces. Secondly chips and the like may be left on the plane face under the grasping member and may not be removed from the tool, even if a frequently envisaged subsequent blowing-off step is carried out when moving the tool into and out of the magazine. In spite of the planned cleaning step chips may therefore be left on the highly accurate contact surfaces, e.g. with a steep taper or an HSK shank. They may then be transported into the tool support on the work spindle, where they will cause measuring inaccuracies. But almost as a side effect, the solution according to the invention makes it unnecessary to include the functional surfaces for holding the tool; instead these surfaces are kept exposed and may be cleaned optimally with compressed air or a flushing liquid or the like.

A further advantage of the gripper structure is that it is comparatively compact, as said first member engages e.g. in the groove in the tool and said second member is juxtapoed, lying against the surface of the shank. If this principle is reflected in an axis or plane at right angles to the longitudinal axis, a gripper thus arranged can also grasp into the groove and another part of the shank. So with this principle, it is basically possible for two grippers to grasp the tool simultaneously. However this is the basic prerequisite for an encircling system comprising two grippers.

The gripper structure according to the invention provides three advantages: firstly it allows the tools to be arranged compactly in a tool rack; secondly it allows the workpiece to be encircled directly without using an additional encircling element and thirdly the gripper structure is chosen so that the functional surfaces are not required for holding, i.e. they cause no problems even when the tool is inserted in the work spindle, and the surfaces are accessible for cleaning.

In a preferred embodiment of the tool magazine system according to the invention, the first member and the second member can be moved relative to each other, and in particular can be moved linearly or swivelled towards each other. The proposed mobility allows the tool to be grasped and the relative mobility may be brought about by three different principles, namely solely by movement of the first or the second member or by movement of both members. According to the mount and the choice of drive it is advantageous for the first and second members either to be movable linearly towards each other or to be swivelled towards each other, e.g. if one member is hinged.

In a preferred embodiment of the tool magazine according to the invention, the first member is stationary relative to the gripper and the second member is constructed for movement towards it. The first member is preferably formed with a spring-like contact surface which engages in a peripheral groove in the shank. The second member, which is responsible for fixing the tool in a radial direction (the tool being fixed in an axial direction by the first member), is movable towards it.

Of course, it is similarly possible for the kinematics to be appropriately exchanged.

The invention also relates to a machine tool equipped with either a gripper, a tool magazine system or an encircling system as described. A machine tool of this type is employed particularly for machining workpieces, but it can also be used for other purposes, for example this principle may be applied to assembly machines where appropriate assembly tools are mounted in the work head by means of the invention.

BRIEF DESCRIPTION OF THE SEVERAL VIEWS OF THE DRAWINGS

The invention is shown diagrammatically in the accompanying drawings, in which.

DETAILED DESCRIPTION

Figure 1:
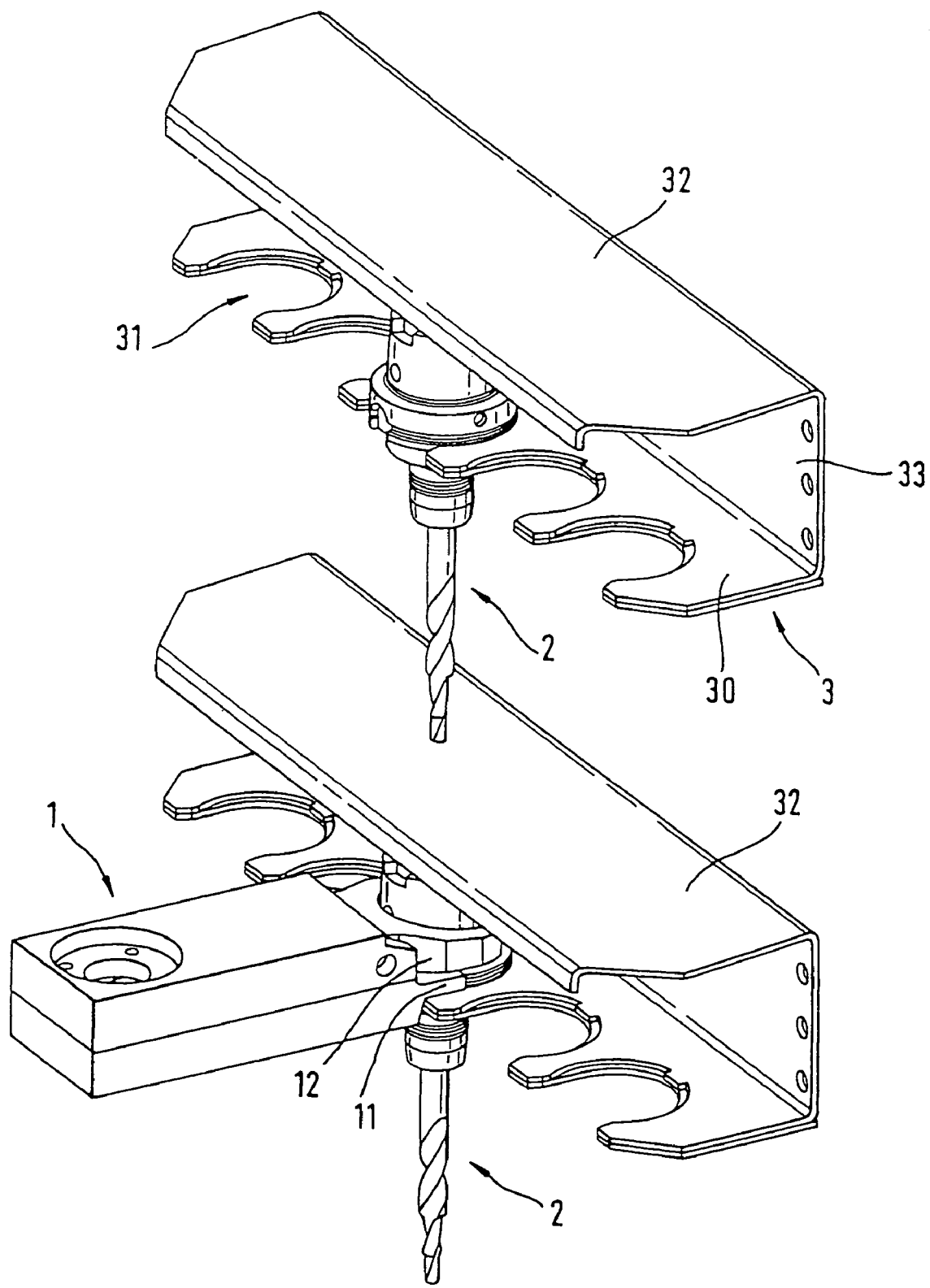
FIGS. 1, 2 are a perspective view (FIG. 1) and a side view (FIG. 2) of a tool magazine system according to the invention.
Figure 2:
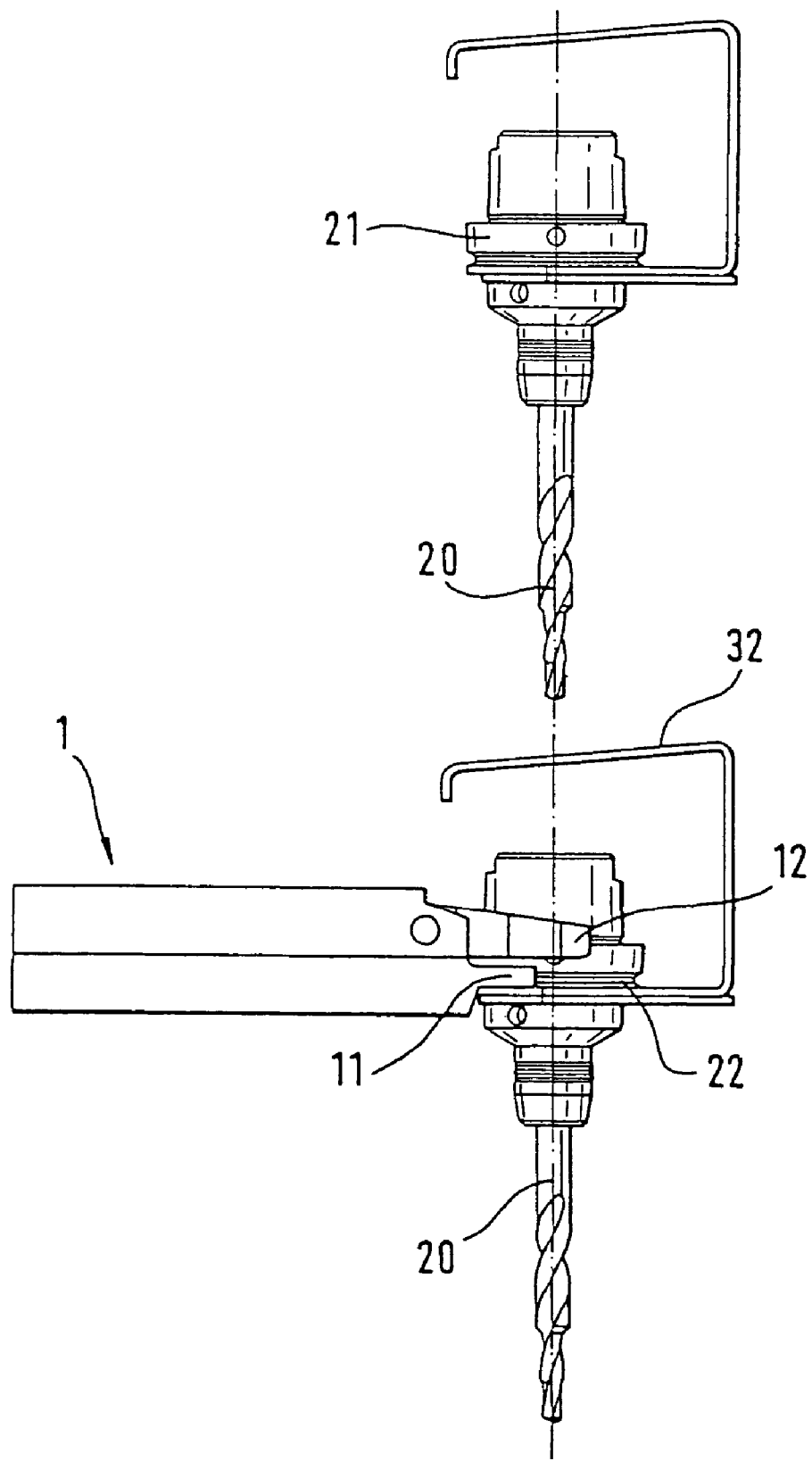

The tool magazine system according to the invention is shown diagrammatically in FIGS. 1 and 2. The tools 2 are stored in a tool magazine 3 and picked up by a gripper 1 when required. The magazine 3 may for example comprise a tool rack with a plurality of superimposed rack bases 30. The bases 30 have a vertical back 33, on which they may be fixed to a supporting wall, supporting frame or the like (not shown). The tool carrier 34 projecting substantially at right angles to the back 33 has openings 31 at its front side, facing away from the back; the openings correspond to the outside diameter of the tool or tool shank 21 to be held and form the bearing means 31. Appropriate shoulders are moulded in the tool carrier 34 in the region of the openings for that purpose.

A dripping sheet 32 is arranged above the tool 2 to prevent cooling liquid from dripping down from a still wet tool 2 put into the rack onto a tool below it and fouling the latter, particularly on the sensitive functional surfaces or locating surfaces (HSK shank or steep taper shank).

With the arrangement according to the invention the rack bases 30 are substantially superimposed and the whole tool magazine system can therefore be made relatively compact.

FIGS. 1 and 2 showing the lower tool magazine 3 illustrates the use of the gripper according to the invention. In respect of the longitudinal axis or axis of rotation 20 the gripper 1 is fed to the tool 2 at right angles. The gripper 1 is guided/moved by a manipulator (not shown) along all space axes and in respect of a plurality of rotational axes; it has two members 11 and 12.

Figure 3:
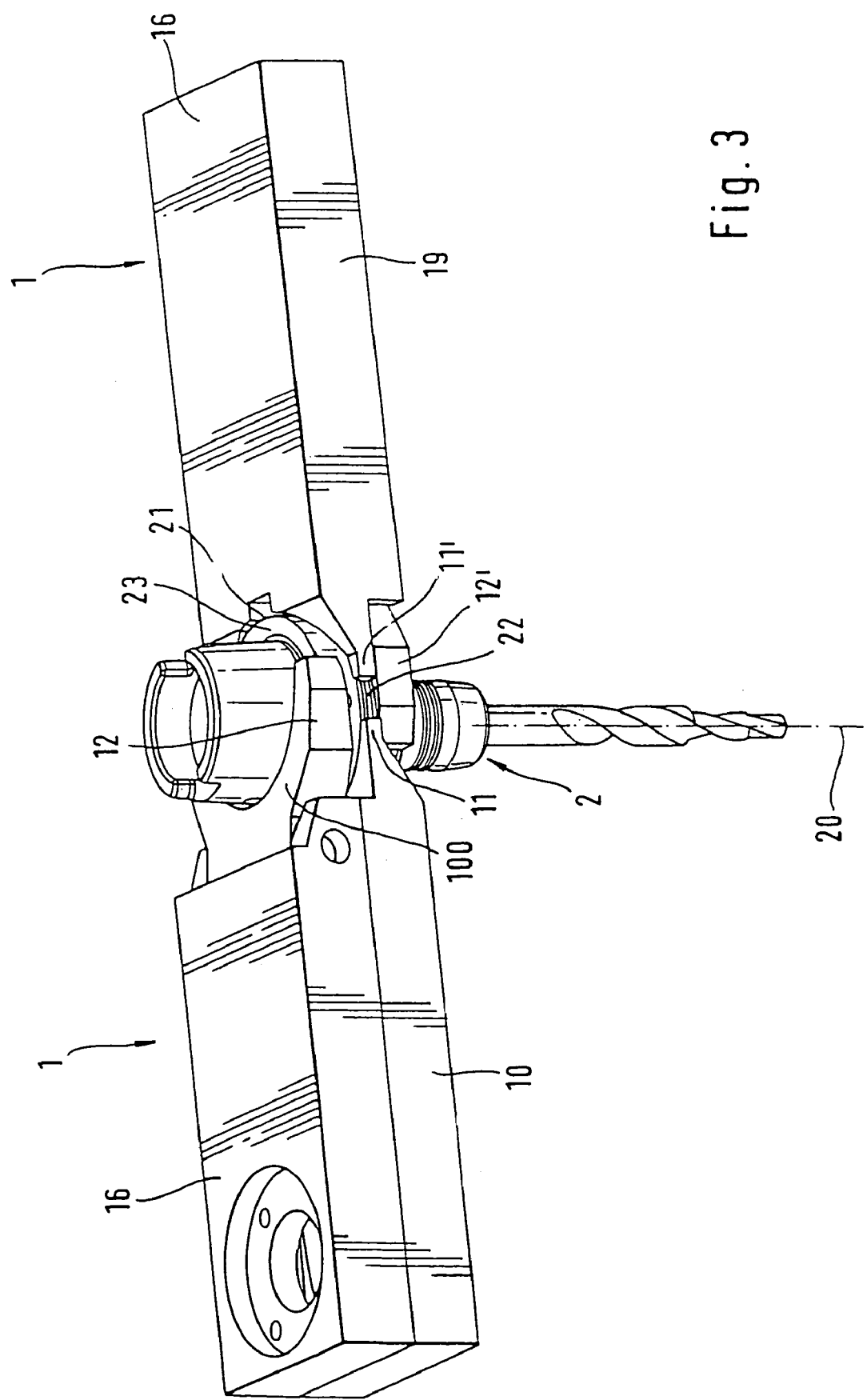
FIG. 3 is a perspective view of two grippers according to the invention in the encircling system, also according to the invention.
Figure 4:
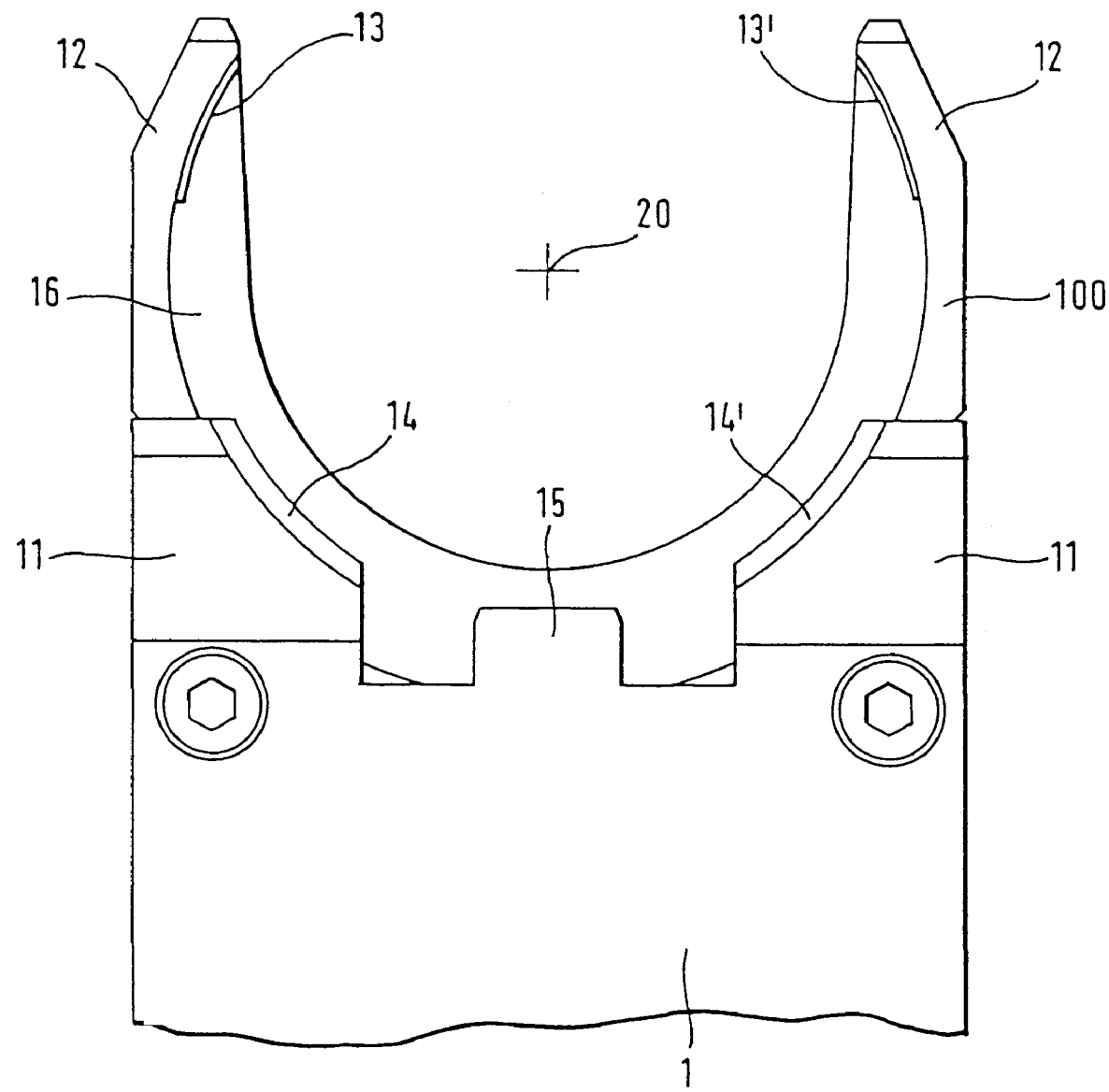
FIG. 4 is a plan view of a detail of the gripper according to the invention.

The exact form of the gripper 1 can be seen particularly from FIGS. 3 and 4.

FIG. 3 particularly shows the encircling of the tool 2 by two substantially identical grippers 10, 19. However the grasping of the tool 2 by the gripper 1 will first be explained in detail.

As already described, the gripper 1, 10 comprises a gripper arm 16 which has two members, namely a first member 11 and a second member 12, at its front end. The two members 11 and 12 cooperate to hold the tool 2 securely.

In the embodiment shown here the second member 12 is pivotable about an axis directed perpendicular to the longitudinal axis 20 and normally arranged horizontally, i.e. it is mounted movably whereas the first member 11 is fixed to the gripper arm 16. The first member 11 has at least one contact surface 14, 14' (FIG. 4). The contact surface 14 is spring-like, of a prismatic shape and its profile corresponds to the shape of the groove 22 in the circumference of the tool shank 21 or tool 2. This groove 22 in the circumference is commonly used in the tool development field, specifically for cutting tools and is normally a standard feature. Insertion of the contact surface 14 in the groove 22 causes the tool to be fixed axially of the longitudinal axis 20 relative to the gripper 1. There is thus still movement in the radial plane, and these degrees of freedom are eliminated by interaction between the second member 12 and the tool 2. Contact surfaces 13. 13' are provided on the second member 12 for this purpose, the tool being located in the gripper between those surfaces and possibly also being held with a clamping action.

It is advantageous for the shank 21 in contact with the second member to have a larger diameter or external dimensions than the rest of the tool 2. Given the claw-like shape of the second member 12, this ensures that the claw engages over half of the diameter of the tool shank 21. The second member 12 is moved over the axis of the tool in the region of the narrower diameter, then pivoted onto the shank in a movement component in the direction of the longitudinal axis of the tool. Half of the diameter describes the distance which has to be overcome in order to position the outer regions of the claw-like member 12 behind the maximum outside diameter of the shank/tool. To achieve this an e.g. cylindrical tool shank corresponding to at least half of the diameter, has to be moved into an appropriate support in order to allow the cylinder to engage from behind in the claw.

The interaction between the contact surfaces 13, 13' of the second member 12 is shown especially in FIG. 4, which is a view of the gripper 1 according to the invention from below. In a movement like the closing of a flap the second member 12 is moved towards the first member 11 on grasping the tool, and the tool 2 is thus fixed in an axial and radial direction in the gripper. The contact surfaces 13, 13' are at a peripheral spacing of less than 180° at the side of member 12 towards the claw aperture, to eliminate the two remaining degrees of freedom, the possibility of plane movement in radial mobility, in cooperation with the contact surface 14 of the first member 11.

In the embodiment shown in FIGS. 3 and 4 a cover 100 is provided on the second member 12. However, the underside of the cover need not necessarily come into contact with the tool in order to produce the holding effect. The cover 100 may equally be omitted.

It is a great advantage of the invention that the tool 2 is grasped radially with respect to the longitudinal axis 20. The shoulders, longitudinal slots and the like which are otherwise provided on the tool shank 21 are not then necessary to secure the tool 2. The functional surfaces 23 in particular, which define an exact location and position of the tool 2 in the work spindle and/or relative to the workpiece, are not needed to grasp the tool and hence these surfaces are exposed during handling, e.g. for cleaning.

For this purpose, a gap is also left between the cover 100 and the functional surface 23, that is to say, the internal surface of the cover 100 does not lie directly on the surface 23.

This arrangement prevents the functional surface from being damaged and allows it to be cleaned at any time.

FIG. 4 shows that two contact surfaces 14, 14' are provided on the first member 11, in this case the stationary one, and extend at a peripheral angle of approximately 30° with a peripheral spacing of approximately 60° to 90°. Secure supporting of the tool 2 is thus achieved. For radial alignment or securing in position, a position-securing means 15, e.g. in the form of a slot block, is also provided on the first member 11 and engages in a corresponding recess in the tool.

The contact surfaces 13, 13' on the second member 12 are generally accurately machined and allow the front region of the second member 12 to make positive, clamping contact with the tool shank 21. The contact surface 13, 13' also extends over an angular region of approximately 15° to 30°. Alternatively no clamping need be provided here and contact substantially without any play may sometimes be sufficient.

Figure 5A:
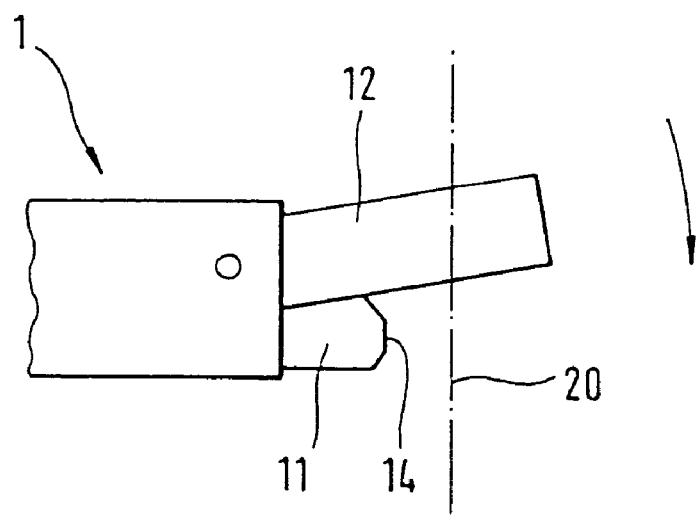
FIGS. 5*a*, 5*b* are a side view (FIG. 5*a*) and a plan view (FIG. 5*b*) of two different embodiments of the principle of the gripper according to the invention.
Figure 5B:
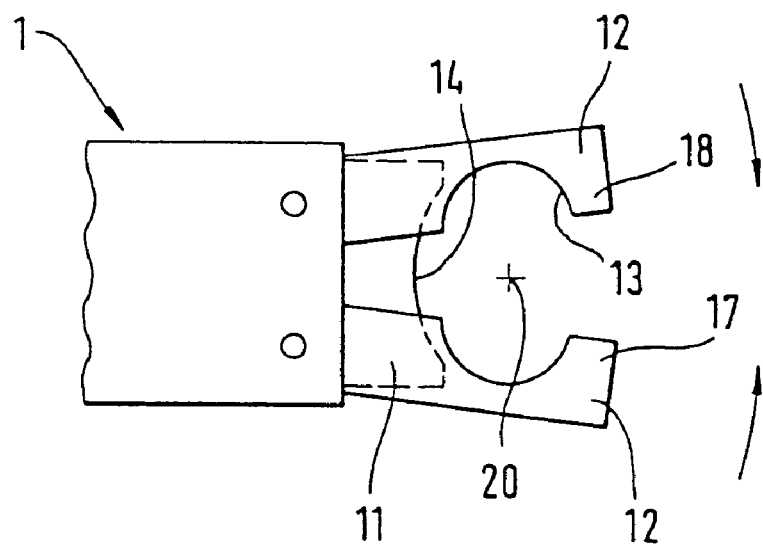

FIG. 5*b* shows that the principle according to the invention may be carried out not only on a closing flap basis (FIG. 5*a* and FIGS. 3 and 4 respectively) but also on a tongs principle. In this connection the second member 12 comprises two elements 17, 18 which interact like claws or tongs. For this purpose they are mounted in an articulated manner about points of rotation and equipped with appropriate drives. In the case of the principle illustrated in FIG. 5*b*, the first member 11 is located below the elements of the second member 12. The axis 20 of the tool 2 is indicated by a cross and the tool 2 is not otherwise shown.

It is proposed according to the invention that the first and second members 11, 12 should be movable relative to each other. With this in view, a drive is provided, for example in the form of a hydraulic or pneumatic operating cylinder incorporated in the gripper arm 16 or e.g. of an electric motor. This enables separate actuating means to be provided as the drive, i.e. it enables the movement of the gripper on its manipulator to be utilised so that the gripper is guided to appropriate stops and the members 11, 12 are then moved by virtue of the drive for the gripper. The separate actuation may alternatively be provided by the second gripper or other elements on the machine tool, and so on.

Provision is also made to allow the members 11, 12 which can move towards each other, or elements 17, 18 of the second member 12 to be fixed to each other. To this end wedge-type systems, pins or the like may be provided to hold the tool 2 securely in the gripper 1. But fixing may also be effected by appropriately constructed operating cylinders and so on.

It is further beneficial for the members 11, 12 which can be moved towards each other and/or for the elements 17, 18 to have a locking means. Locking may, for example, equally be effected by a hydraulic or pneumatic operating cylinder. But appropriate springs (compression, tension or cup springs) may also be provided, arranged counter to the working direction of the operating cylinder. If the operating cylinder or the drive is not actuated, the force of these passive elements, e.g. the spring, acts as a locking means. If movement in the opposite direction is required, the operating cylinder has to exert enough force to overcome the force of the locking means.

In the process of grasping the tool 2 the contact surface 14, 14' of the first member 11 is first inserted in the peripheral groove 22 of the tool shank 21. It is equally possible to provide an annular slot, a groove, recess or shoulder or a retaining lug or the like on the tool 2 and/or the tool shank 21 instead of the peripheral groove. Previously, simultaneously or subsequently the second member is taken to the tool shank 21 or tool 2 with a clamping action, the second member 12 engaging its surface. As shown in FIG. 5a the second member 12 moves towards the first member 11, in the process going through a pivoting motion directed at an acute angle or almost parallel to the longitudinal axis 20. When the tool is released or let go, the procedure described above may for example be reversed, with the second member 12 first being removed from the shank 21 or tool 2 and overcoming the clamping, in that the first member 11 forms an abutment for the purpose in its interaction with the tool 2 and/or tool shank 21. The clamping effect is overcome in a movement in an axial direction, with the axial fixing of the tool by the first member being utilised as an abutment.

With the principle illustrated in FIG. 5a the second member 12 does move sectionwise in a longitudinal direction, i.e. parallel to the longitudinal axis 20, but only one member 12 of the gripper 1 is moved. The gripper 1 as a whole is fed to the tool laterally, e.g. substantially at right angles to the longitudinal axis 20 and hence it particularly allows a vertical arrangement of four superimposed tools. The proposed movement of the member 12 has the effect of sliding the member 12 into a region above the tool in which the diameter is smaller, as the claw-like construction of the second member 12 has to encircle the complete tool. The member 12 is therefore positioned so that it engages over the tool in the narrower region and is then guided onto the shank at an acute angle or substantially parallel to the longitudinal axis and is fixed to the shank with a clamping action.

The vertical component or a component parallel with the longitudinal axis 20 of the second member 12 is not omitted from the FIG. 5b proposal, since a tongs or claw movement of the two elements 17 and 18 which can be moved towards each other is provided there. The movement of the elements 17, 18, either together or separately, takes place in a plane at right angles to the longitudinal axis 20.

An encircling system according to the invention for engaging round an article such as the tool 2 is shown in FIG. 3. The system comprises two grippers 10, 19 of identical construction. However the presence of two identical grippers is not essential for the invention to be used. The two grippers 10, 19 are arranged so that they are rotated relative to an axis normal to the longitudinal axis 20 of the tool and engage the tool at different sides.

As will be seen from FIG. 3, the construction particularly of the first member 11, 11' is chosen so that these sections engage the tool opposite one another and form a gap between them, that is to say, the first member 11 does not engage around the complete semi-circle of the tool shank 21. The second member 12, 12', however, engages over the widest point of the diameter of the tool 2 or tool shank 21, though in each case on opposite sides of the shank relative to the groove 22. Owing to the twisted arrangement the two side members 12, 12' do not collide, as they act on different sections of the shank relative to the groove 22.

The claims filed now with the application and later are attempts to formulate our claim without prejudicing the obtaining of further protection.

The references to the main claim contained in the dependent claims indicate how the subject matter of the main claim is further elaborated by the features of the respective sub-claim. They should not, however, be interpreted as forgoing the obtaining of independent, objective protection for the features of the related dependent sub-claims.

Features which have so far only been disclosed in the description may in the course of the proceedings be claimed as being essential to the invention, e.g. in order to distinguish it from the state of the art.

The invention claimed is:

1. An encircling system for encircling a tool, the system comprising
    two substantially identical grippers,
    said two substantially identical grippers being moved independently of each other and inverted with respect to each other about an axis normal to a longitudinal axis of said tool and engaging said tool on opposing sides at regions of the tool directly adjacent to each other and located one above the other for passing the tool from one of the two substantially identical grippers to the other of the two substantially identical grippers and to center the tool between the two substantially identical grippers.

2. The encircling system according to claim 1, wherein a first member of each of said two substantially identical grippers engages in a peripheral groove in said tool and a second member of each of said two substantially identical grippers engages a shank section of the tool adjacent said groove.

3. An encircling system for encircling a tool having a shank with a peripheral groove, said encircling system comprising:
    two grippers for placement on opposite sides of the tool,
    each of the two grippers including a first member for engaging the peripheral groove of the tool and a second member for engaging the shank of the tool with the second member of one of the grippers engaging the shank above the groove and the second member of the other of the grippers engaging the shank below the groove,
    each said second member moving along a longitudinal axis of the tool to grasp the tool by each said second member,
    the two grippers being movable in a direction perpendicular to a longitudinal axis of the tool to engage the tool from opposite sides.

4. The encircling system according to claim 3, wherein each said second member includes two claw elements.

5. The encircling system according to claim 3, wherein a contact surface of each said first member for contacting the tool projects radially inwardly from a contact surface of each said second member for contacting the tool.

6. The encircling system according to claim 5, wherein each said first member includes two said contact surfaces and a positioning securing tab.

7. The encircling system according to claim 3, wherein the two grippers which grip on two different sides of the tool are twisted about an angle of 180° against each other.

8. An encircling system for encircling a tool having a shank with a peripheral groove, said encircling system comprising:
    two grippers for placement on opposite sides of the tool, each of the two grippers including a first member for engaging the peripheral groove of the tool and a second member for engaging the shank of the tool with the second member of one of the grippers engaging the shank above the groove and the second member of the other of the grippers engaging the shank below the groove, said second member including two claw elements, the two grippers being movable in a direction perpendicular to a longitudinal axis of the tool to engage the tool from opposite sides, the first member including two contact surfaces having a peripheral spacing of approximately 60° to 90° separating the two contact surfaces and each of the two contact surfaces having a peripheral angle of approximately 30°.

9. An encircling system for encircling a tool having a shank with a peripheral groove, said encircling system comprising:

two grippers for placement on opposite sides of the tool, each of the two grippers including a first member for engaging the peripheral groove of the tool and a second member for engaging the shank of the tool with the second member of one of the grippers engaging the shank above the groove and the second member of the other of the grippers engaging the shank below the groove, the two grippers being movable in a direction perpendicular to a longitudinal axis of the tool to engage the tool from opposite sides, a contact surface of each said first member for contacting the tool projects radially inwardly from a contact surface of each said second member for contacting the tool, each said first member including two said contact surfaces and a positioning securing tab.

* * * * *